(12) United States Patent
Yang

(10) Patent No.: US 7,096,762 B2
(45) Date of Patent: Aug. 29, 2006

(54) WRENCH DRIVEN ROTATION HAND TOOL WITH SIDE HANDLE

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 171 days.

(21) Appl. No.: 10/686,722

(22) Filed: Oct. 17, 2003

(65) Prior Publication Data

US 2005/0081684 A1 Apr. 21, 2005

(51) Int. Cl.
*B25G 3/02* (2006.01)
(52) U.S. Cl. .......................................... 81/28
(58) Field of Classification Search ............. 81/28, 81/29, 30, 31, 32, 33, 34, 35, 36, 37
See application file for complete search history.

(56) References Cited

U.S. PATENT DOCUMENTS

| 5,722,307 A | * | 3/1998 | Chen | 81/58.3 |
| 6,145,413 A | * | 11/2000 | Lin | 81/63.1 |
| 6,427,560 B1 | * | 8/2002 | Shea | 81/58.1 |

* cited by examiner

*Primary Examiner*—Jacob K. Ackun, Jr.
(74) *Attorney, Agent, or Firm*—Rabin & Berdo, P.C.

(57) ABSTRACT

A wrench driven rotation hand tool with side handle; as required, an independent axial knob and a lateral side handle are selected to be incorporated together with a transmission gear set to a column; the output end of the transmission gear set is provided to drive a main shaft, thus to further drive a cutter or tool; and the input end of the transmission gear is manually driven by a reciprocal handle.

6 Claims, 16 Drawing Sheets

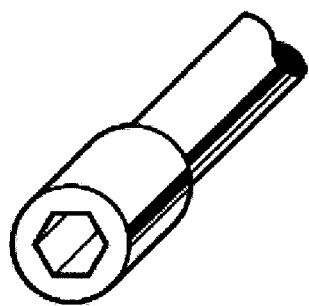  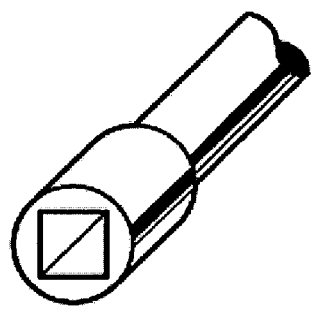
FIG.17  FIG.18  FIG.19
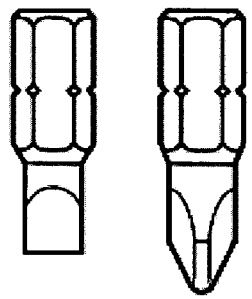  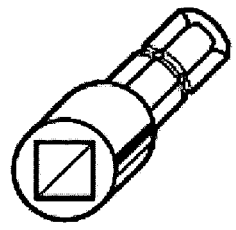
FIG.20  FIG.21  FIG.22

US 7,096,762 B2

WRENCH DRIVEN ROTATION HAND TOOL WITH SIDE HANDLE

BACKGROUND OF THE INVENTION (a) Field of the Invention

The present invention is related to a wrench driven rotation hand tool with side handle, and more particularly to an innovative design of the functions and operation methods of a brace, screwdriver, hand drill, flare nut wrench, or tap wrench that is portable, requires no power, easy use and applicable to service or DIY operation.

(b) Description of the Prior Art

A conventional hand drill is usually provided with a column. One end of the column is provided with a chuck and a tool, and the other end of the column is axially provided with an axial knob. A lateral side handle extending in radius is provided at the middle section of the column. Generally, there are four working points for the user to manipulate, respectively (1) the lateral side handle, (2) the axial knob, (3) the cutter clamped by the chuck or a tip of other types of tool, and (4) manual rotation hand wheel. A canopy transmission gear set is driven by manually rotating the hand tool to further drive the chuck and cutter or the tip of other types of tool attached to a main shaft. The hand drill has the advantage of easy use without having to depend on electric power; however, it also has the disadvantages of sour wrist, and instability in the course of operation. The axial knob adapted to a conventional screwdriver has the difficult to maintain axial stability while driving in a wooden screw since rotation and pressure must be applied at the same time. Similarly, the same difficulty is found in using a socket wrench with an erect handle or a flare nut wrench to drive in a self-tapping screw. Furthermore, in using a tap wrench for tapping operation, maintaining its axially vertical positing is comparatively difficult.

SUMMARY OF THE INVENTION

The primary purpose of the present invention is to provide a wrench driven rotation hand tool with side handle. As required, an independent axial knob and a lateral side handle are selected to be incorporated together with a transmission gear set to a column; the output end of the transmission gear set is provided to drive a main shaft, thus to further drive a cutter or tool; and the input end of the transmission gear is manually driven by a reciprocal handle.

BRIEF DESCRIPTION OF THE DRAWINGS

FIG. 17 is a schematic view showing that the output interface of the main shaft of the present invention is made in a structure of a tip of a socket wrench.

FIG. 18 is a schematic view showing that the output interface of the main shaft of the present invention is made in a structure of an insertion bit.

FIG. 19 is a schematic view showing that the output interface of the main shaft of the present invention is made in a structure of a bit with an insertion hole.

FIG. 20 is a schematic view showing a flat tip and a cross-headed tips of a screwdriver to be inserted into the output interface of the main shaft of the present invention.

FIG. 21 is a schematic view showing a flare nut wrench tip to be inserted into the output interface of the main shaft of the present invention.

FIG. 22 is a schematic view showing a socket wrench tip to be inserted into the output interface of the main shaft of the present invention.

DETAILED DESCRIPTION OF THE PREFERRED EMBODIMENTS

A wrench driven rotation hand tool with side handle of the present invention has at the middle of its column provided a transmission gear set. One end of the column is provided with a main shaft driven by the transmission gear set, and the main shaft in turn drives a cutter or a tool locked to the hand tool. A transmission gearbox is provided with a manually driven, reciprocal wrench handle. As required, a lateral side handle extending in radius may be provided to the middle of the column and an axial knob, to the end of the column not provided with the main shaft. Either of the lateral side handle or the axial knob, if not both, must be provided. The relative angle between the lateral side handle and the reciprocal wrench handle may be determined as required or made adjustable. With the specific structure as described above, the manually reciprocal wrenching is applied to drive the transmission gear set through a one-way transmission, and further to drive the main shaft for producing rotation drive; or the main shaft is driven by a transmission gear set of constant speed ratio, acceleration, reduction, variable speed, or variable direction to exercise rotation drive in conjunction with the tool adapted to a chuck incorporated to the main shaft, thus to achieve the purpose of manually driven drilling, or fastening or loosening a screw, nut or wooden screw.

Figure 1:
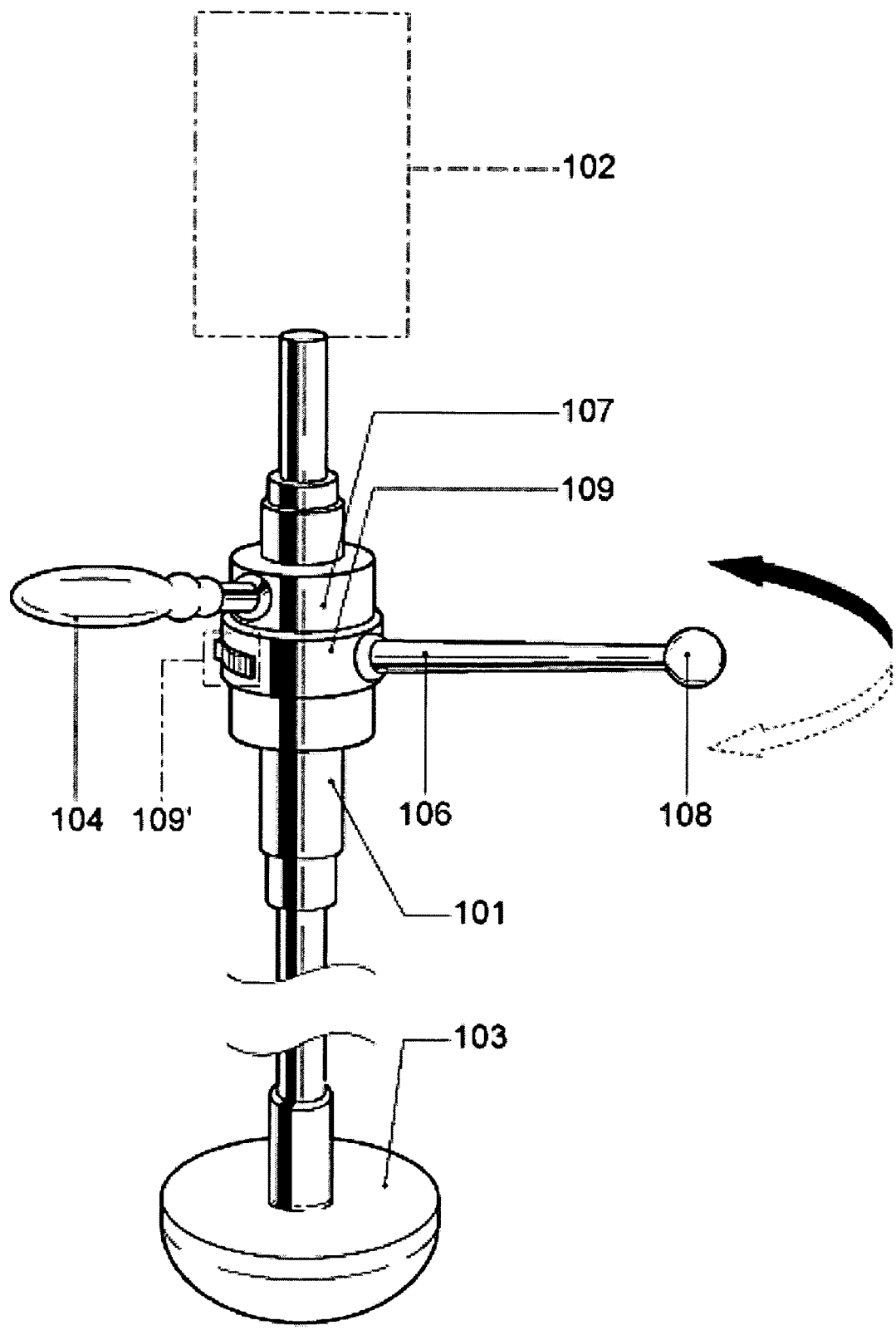
FIG. 1 is a schematic view showing a structure of the present invention laterally adapted with a reciprocal wrenching handle.

As illustrated in FIG. 1, a preferred embodiment of the present invention essentially comprised of a column 101, a chuck is provided at a main shaft extended from one end of the column 101, or saving the chuck, a tip of a tool, such as a screwdriver, socket, or flare nut wrench, is directly provided to the main shaft, or a jaw for the insertion of the tip of a tool, such as the screwdriver, socket, or flare nut wrench is provided to define an output interface 102 of the main shaft ; and an axial knob 103 may be provided to the other end of the main shaft as required while a lateral side handle 104 extending in radius may be provided to the middle of the column 101 as required; is characterized by that at the middle of the column 101, it is provided with:

a reciprocal wrenching handle 106: laterally provided extending in radius from the column 101, and coupled to a one-way drive 109, a grip 108 is outwardly extended for the user to hold and wrench in a preset direction while a transmission gear set 107 is driven by the one-way driver 109 to drive the main shaft and the chuck to further drive the tool or the cutter.

Figure 2:
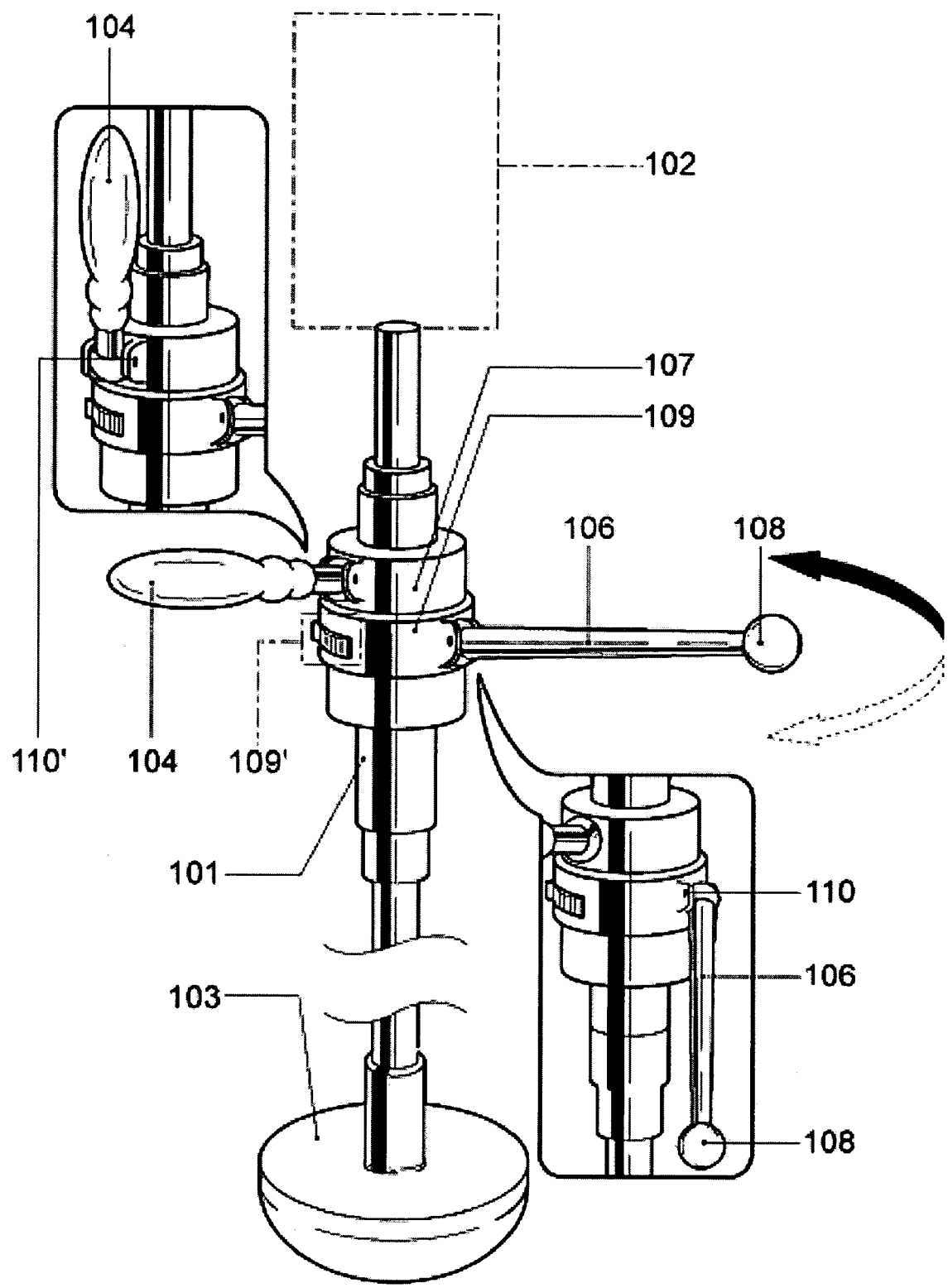
FIG. 2 is a schematic view showing a structure of the present invention adapted with a knuckle joint reciprocal wrenching handle.

Additional to that the reciprocal wrenching handle 106 of the wrench driven rotation hand tool with side handle is laterally provided extending in radius in relation to the one-way drive 109 as illustrated in FIG. 1, a knuckle joint 110 is provided between the reciprocal wrenching handle 106 and one-way drive 109 so that the reciprocal wrenching handle 106 can be push down in the direction parallel with the column 101 to facilitate storage as illustrated in FIG. 2. Similarly, another knuckle joint 110' may be provided between the lateral side handle 104 and the transmission gear set 107 so that the lateral side handle 104 can be pushed down to facilitate storage. Either the reciprocal wrenching handle 106 or the lateral side handle 104 can be fixed to the one-way drive 109 or to the transmission gear set 107.

Figure 3:
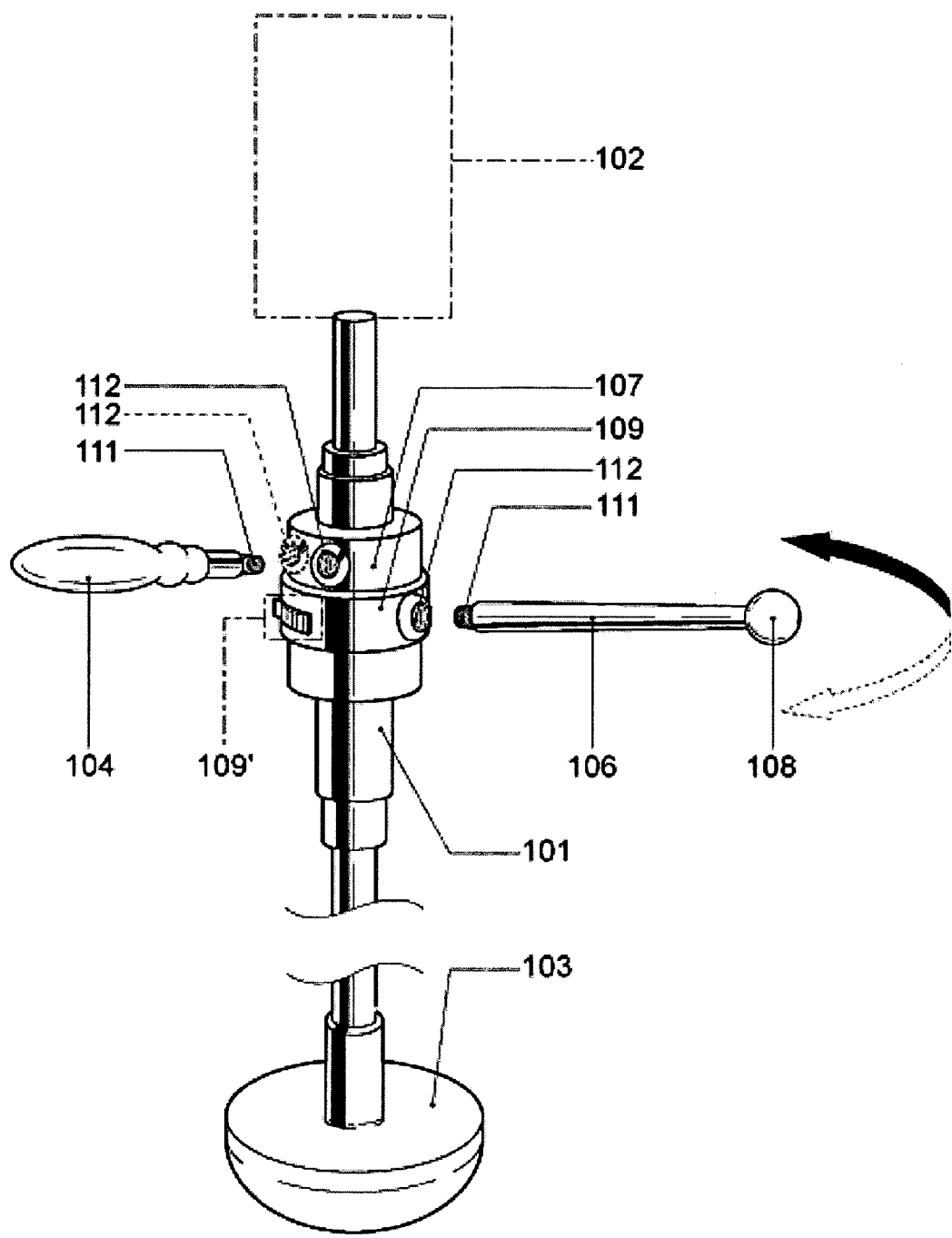
FIG. 3 is a schematic view showing a structure of the present invention adapted with a reciprocal wrenching handle that is capable of driving in or out.

Alternatively, if required, one screw hole or multiple screw holes 112 at different angles may be provided on the transmission gear set provided between the reciprocal wrenching handle 106 and the one-way drive 109 as illustrated in FIG. 3. A worm gear 111 and one screw hole or multiple screw holes 112 at different angles may be provided to the lateral side handle 104 so that the lateral side handle 104 is made retractable to the transmission gear set with angle adjustable.

The one-way drive 109 is provided at where between the reciprocal wrenching handle 106 and the transmission gear set 107 so to transmit kinetics created by pushing the reciprocal wrenching handle 106 in one direction to the transmission gear set 107, or the reciprocal wrenching handle 106 is idling when pushed in the other direction. The transmission direction and the idling drive direction can be fixed, or a switch 109' allowing interchange of direction may be provided on the one-way drive 109. The switch 109' may be further provided with an intermediate location to permit drive in both ways.

Figure 4:
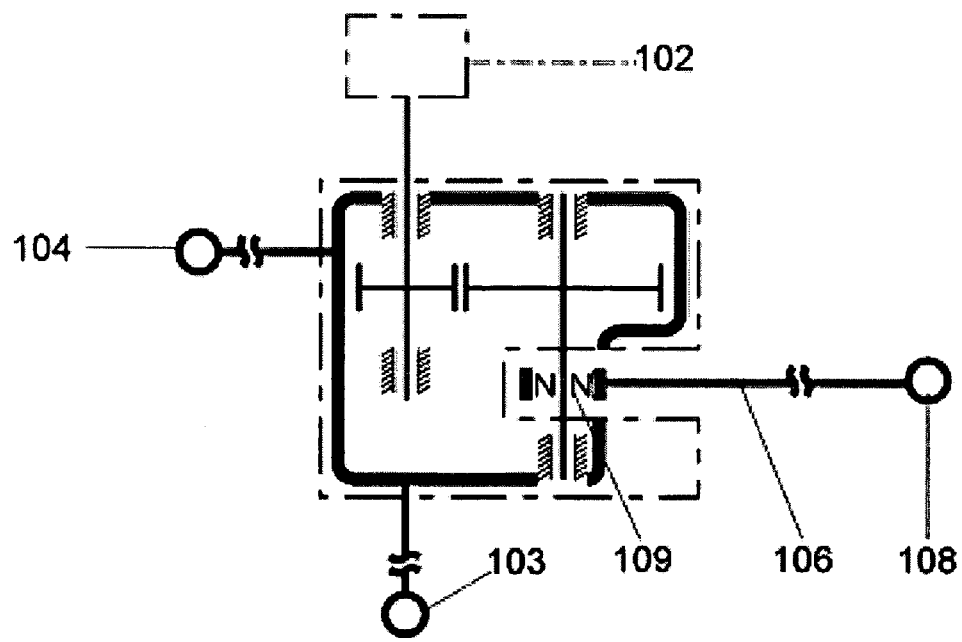
FIG. 4 is a schematic view showing that the transmission gear set of the present invention is related to a structure of external transmission acceleration gear set.
Figure 5:
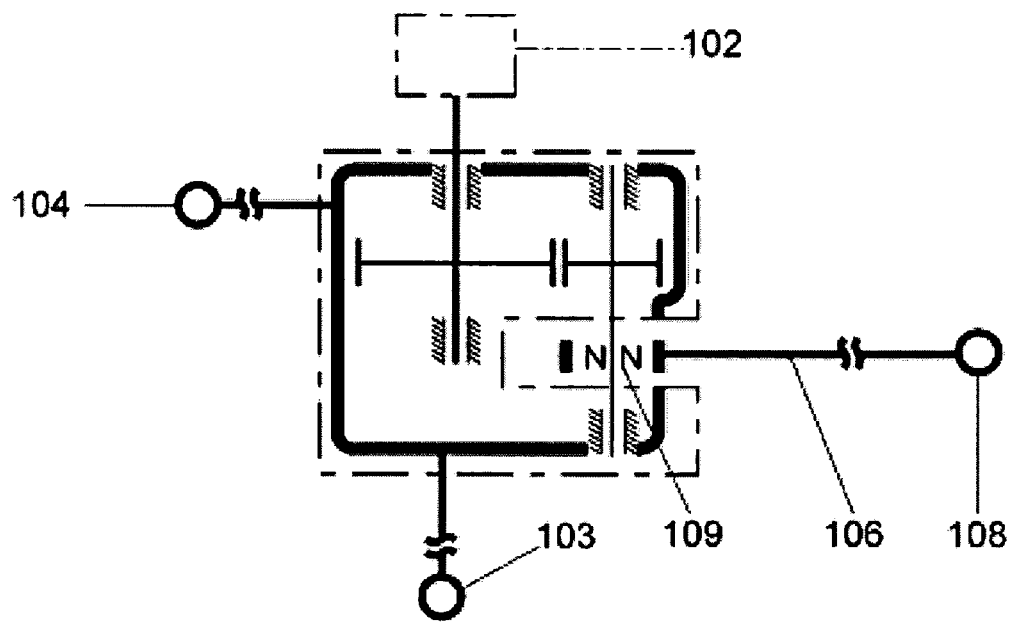
FIG. 5 is a schematic view showing that the transmission gear set of the present invention is related to a structure of external transmission reduction gear set.
Figure 6:
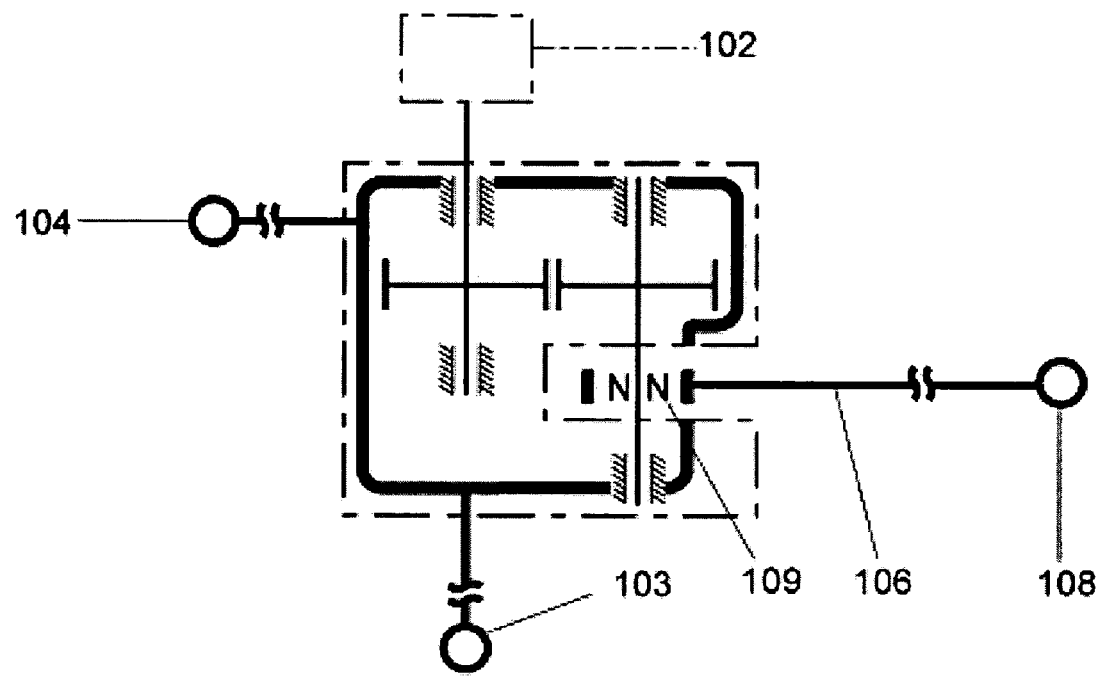
FIG. 6 is a schematic view showing that the transmission gear set of the present invention is related to a structure of external transmission equal speed gear set.
Figure 7:
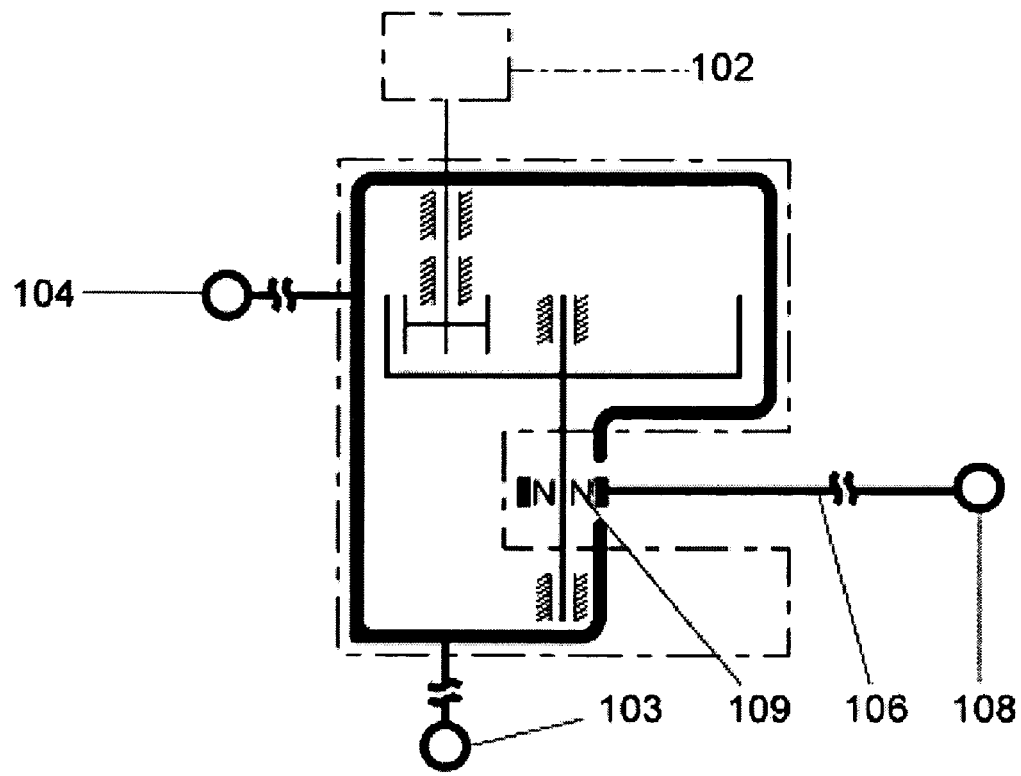
FIG. 7 is a schematic view showing that the transmission gear set of the present invention is related to a structure of internal transmission acceleration gear set.
Figure 8:
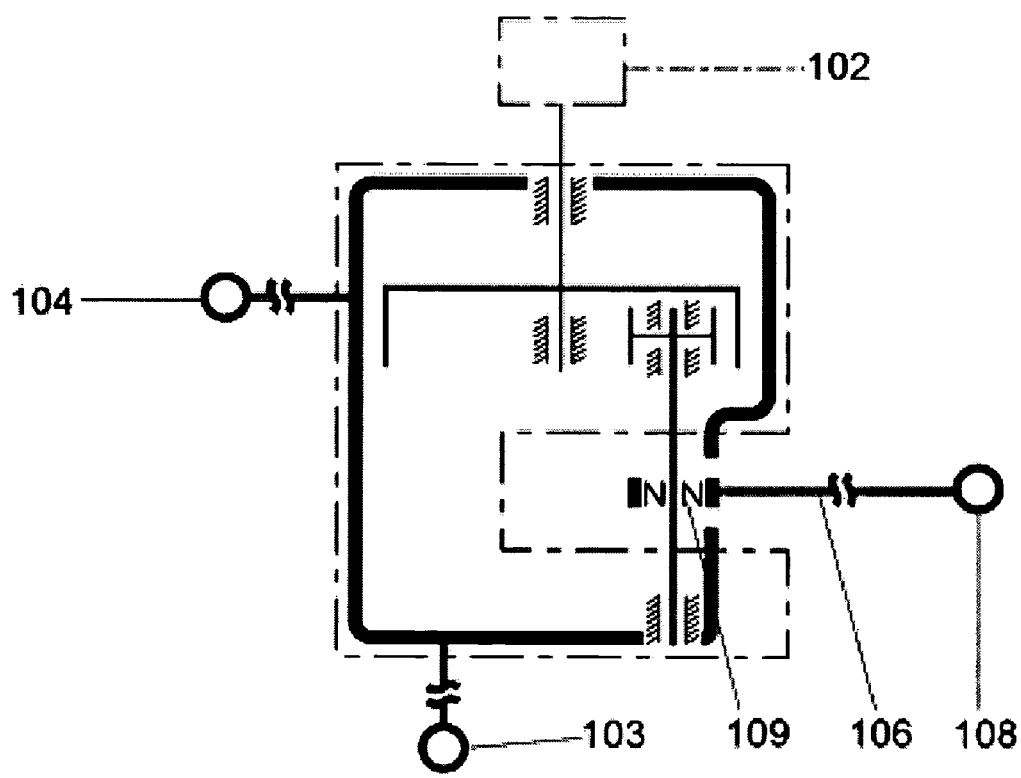
FIG. 8 is a schematic view showing that the transmission gear set of the present invention is related to a structure of internal transmission reduction gear set.

The transmission gear set 107 includes a conventional planet or parallel gear set for driving the main shaft and the chuck. The transmission gear set includes an external transmission acceleration gear set includes that of equal speed ratio, acceleration ratio, and reduction ratio as illustrated in FIG. 4, or an external transmission reduction gear set as illustrated in FIG. 5, or an external transmission equal speed gear set as illustrated in FIG. 6, or an internal transmission acceleration gear set as illustrated in FIG. 7, or an internal transmission reduction gear set as illustrated in FIG. 8, or the planet gear set or other conventional transmission.

As required, the transmission gear set 107 may be made to permit switching among speed ratios, or output rotation direction.

Figure 9:
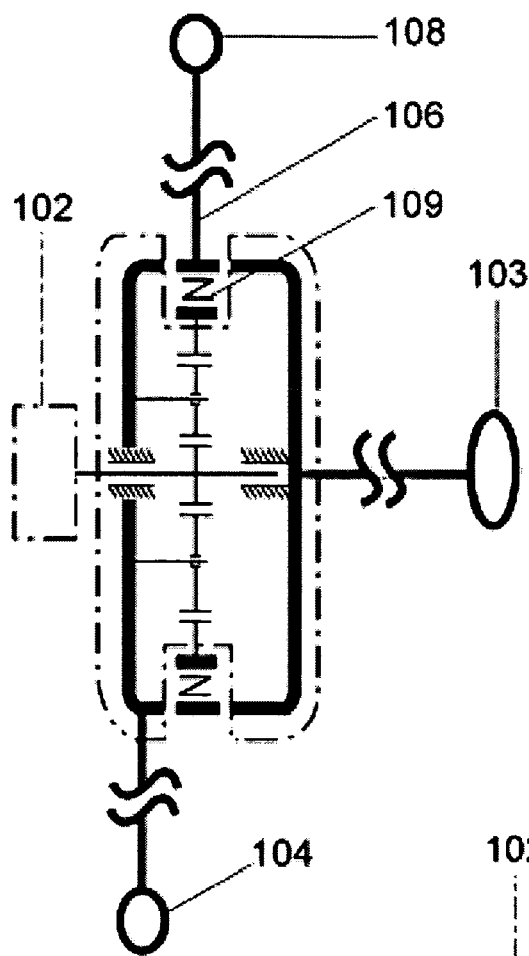
FIG. 9 is a schematic view showing a preferred embodiment of a transmission gearbox of the present invention is related to a planet gear set as a transmission gearbox.

The transmission gear set 107 may be comprised of any of those conventional gears. Wherein, if the transmission gear set 107 is comprised of the planet gear set, the output may be in any or multiple of the following types as desired:

(1) As illustrated in FIG. 9, the reciprocal wrenching handle 106 is provided to drive a sun gear and is fixed to the column by means of an external gear while the arm of the planet gear set drives the output interface 102 of the main shaft.

Figure 10:
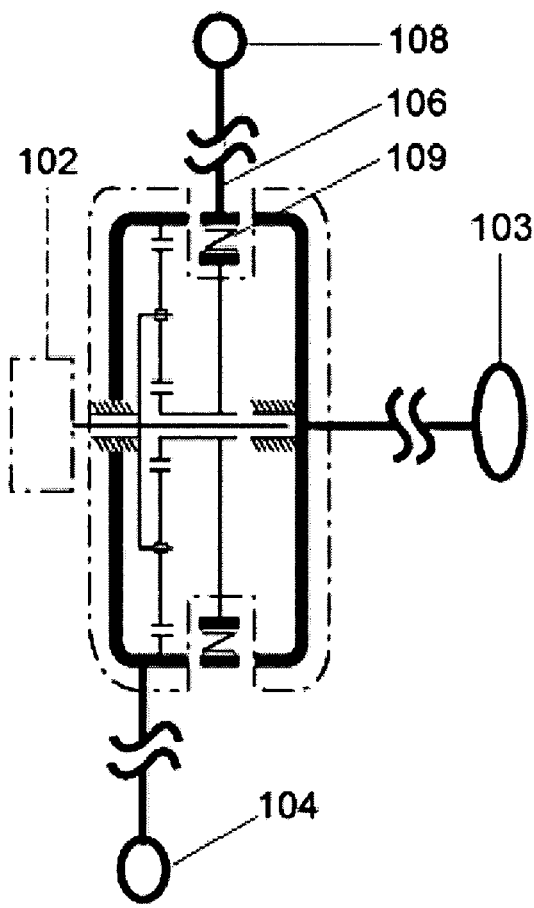
FIG. 10 is another schematic view showing the preferred embodiment of the transmission gearbox of the present invention is related to the planet gear set as a transmission gearbox.

(2) As illustrated in FIG. 10, the reciprocal wrenching handle 106 is provided to drive an external gear and is fixed to the column by means of a planet gear set while the sun gear drives the output interface 102 of the main shaft.

In practice as required, the output may be in any of the following types by referring to FIGS. 9 and 10:

(3) The reciprocal wrenching handle 106 is provided to drive the arm of a planet gear set, and is fixed to the column by means of the arm from the external gear while the sun gear drives the output interface 102 of the main shaft.

(4) The reciprocal wrenching handle 106 is provided to drive the sun gear and is fixed to the column by means of the arm of the planet gear set while the external gear drives the output interface 102 of the main shaft.

(5) The reciprocal wrenching handle 106 is provided to drive the arm of the planet gear set, and is fixed to the column by means of the arm of the sun gear while the external gear drives the output interface 102 of the main shaft.

(6) The reciprocal wrenching handle 106 is provided to drive the external gear and is fixed to the column by means of the arm of the sun gear while the arm of the planet gear set drives the output interface 102 of the main shaft.

Figure 11:
FIG. 11 is a schematic view showing a preferred embodiment of the present invention with a spiral output interface of the main shaft.
Figure 12:
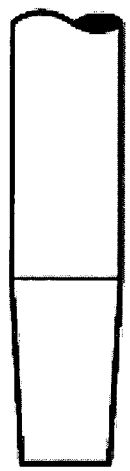
FIG. 12 is a schematic view showing a preferred embodiment of the present invention with a tapered output interface of the main shaft.
Figure 13:
FIG. 13 is a schematic view showing a preferred embodiment of the present invention with a straight key output interface of the main shaft.
Figure 14:
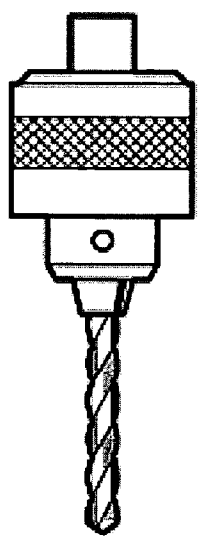
FIG. 14 is a schematic view showing an adjustment chuck adapted to the output interface of the main shaft.
Figure 15:
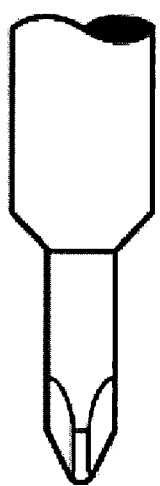
FIG. 15 is a schematic view showing that the output interface of the main shaft of the present invention is made in a structure of a tip of a screwdriver.
Figure 16:
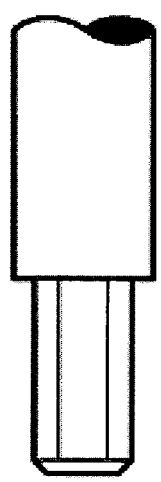
FIG. 16 is a schematic view showing that the output interface of the main shaft of the present invention is made in a structure of a tip of a flare nut wrench.

Depending on the tool or cutter, wrenching force from the main shaft is transmitted by the present invention in any of the following structures:

(1) The output interface 102 of the main shaft is made in a spiral as illustrated in FIG. 11, or tapered as illustrated in FIG. 12, or a straight key as illustrated in FIG. 13, or any other conventional means to incorporate the main shaft and the chuck for mounting the adjustment chuck provided with a screwed hole or tapered hole or parallel hole as illustrated in FIG. 14 to hold the tool or the cutter;

(2) The output interface 102 of the main shaft is forthwith made into a working tip of the tool, including that of a screwdriver as illustrated in FIG. 15, that of a flare nut wrench as illustrated in FIG. 16, that of a socket wrench as illustrated in FIG. 17, or that of any other specific tool; or (3) The output interface 102 of the main shaft is made in a structure of an insertion bit as illustrated in FIG. 18, an insertion bit with a hole as illustrated in FIG. 19, or any jaw that incorporates by magnetism to any tool or cutter for receiving the insertion of a working tip from a screwdriver as illustrated in FIG. 20, or a flare nut wrench as illustrated in FIG. 21, or a socket wrench as illustrated in FIG. 22.

In practice, the optional piece is selected as follows:

(1) To select the axial knob 103: the axial knob 103 is provided whenever the rotation hand tool requires the axial knob 103 for holding or applying axial pressure.

Figure 23:
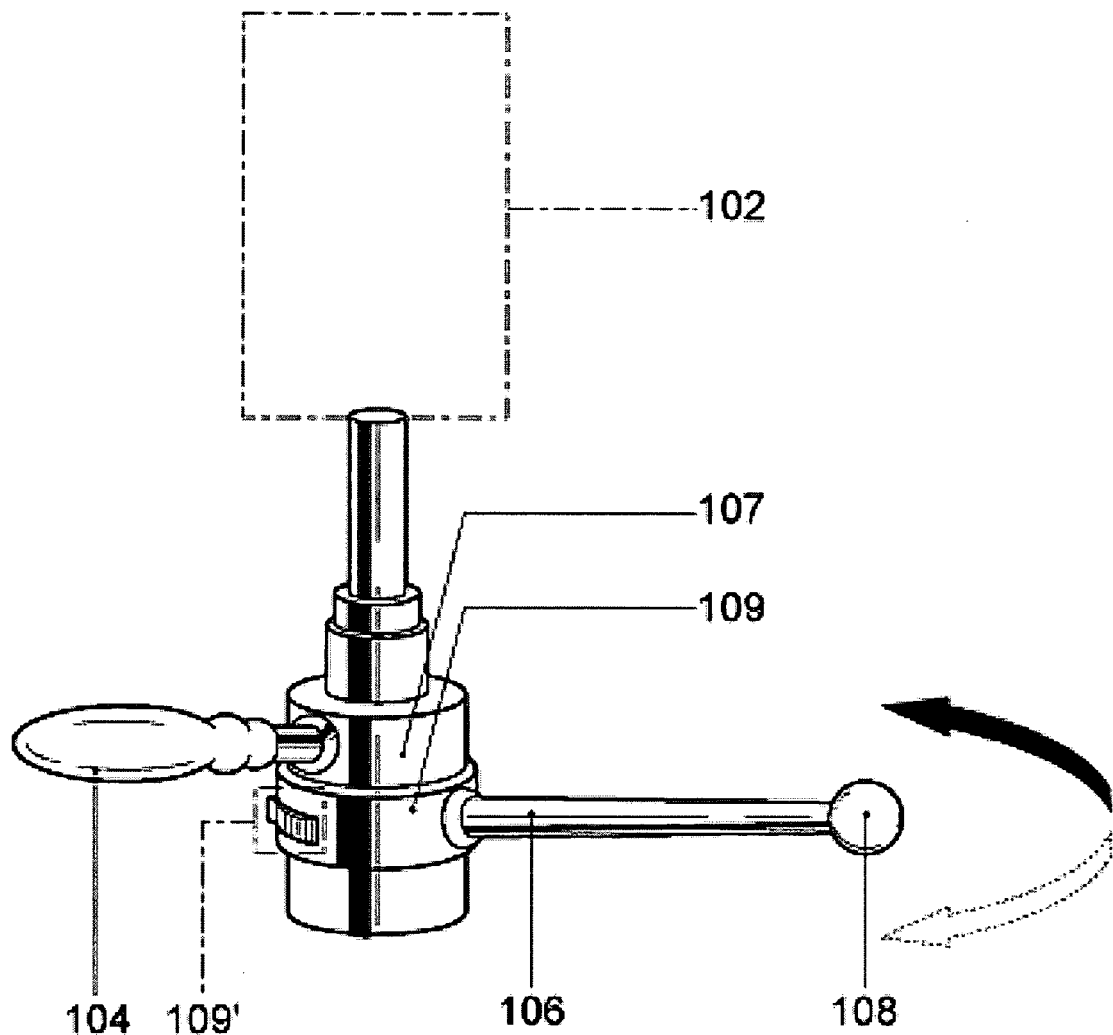
FIG. 23 is a schematic view showing that the preferred embodiment given in FIG. 1 is not provided with an axial knob.
Figure 24:
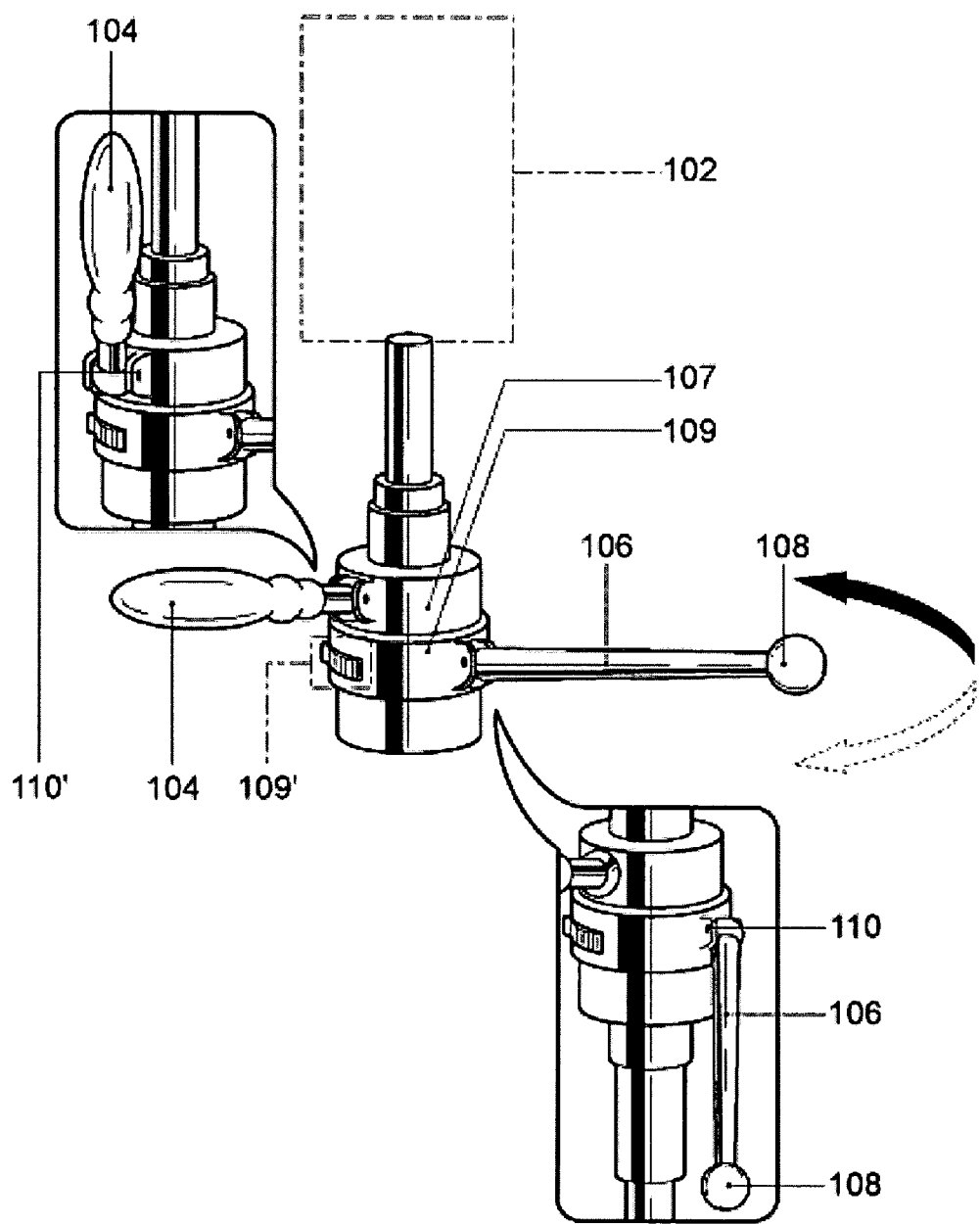
FIG. 24 is a schematic view showing that the preferred embodiment given in FIG. 2 is not provided with an axial knob.
Figure 25:
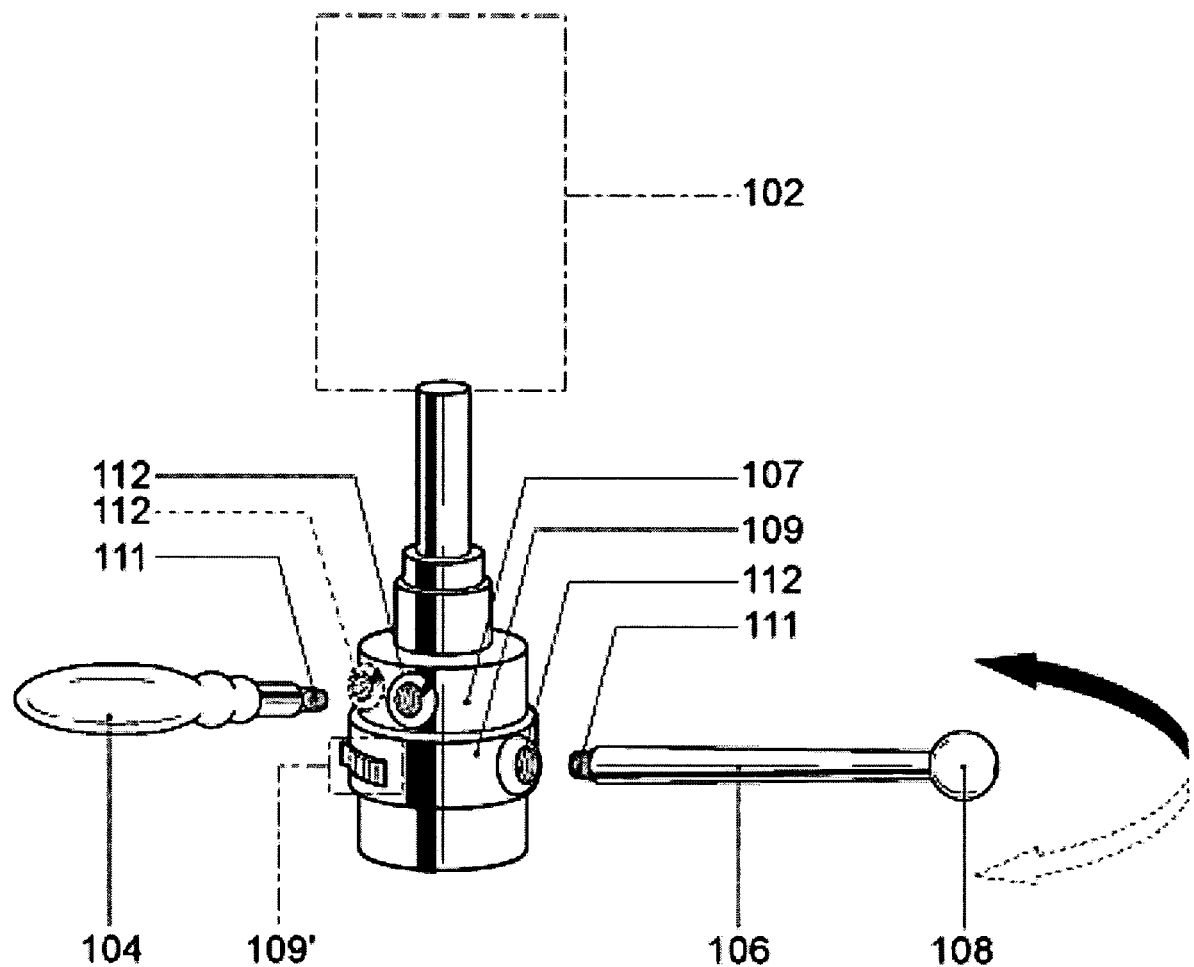
FIG. 25 is a schematic view showing that the preferred embodiment given in FIG. 3 is not provided with an axial knob.

However, if the rotation hand tool does not require the axial knob 103, the installation of the axial knob 103 is waived as illustrated in FIGS. 23, 24 and 25.

(2) To select the lateral side handle 104: the lateral side handle 104 is selected whenever the rotation hand tool requires the lateral side handle 104 for holding, applying axial or direct wrenching on the main shaft, and the relative angle between the lateral side handle 104 and the reciprocal wrenching handle 106 may be preset or made adjustable as desire. Furthermore, as illustrated in FIG. 24, a knuckle joint 110' may be provided to the lateral side handle 104 to be pressed down in parallel with the column for easy storage, or the lateral side handle 104 may be directly fixed to the column.

Figure 26:
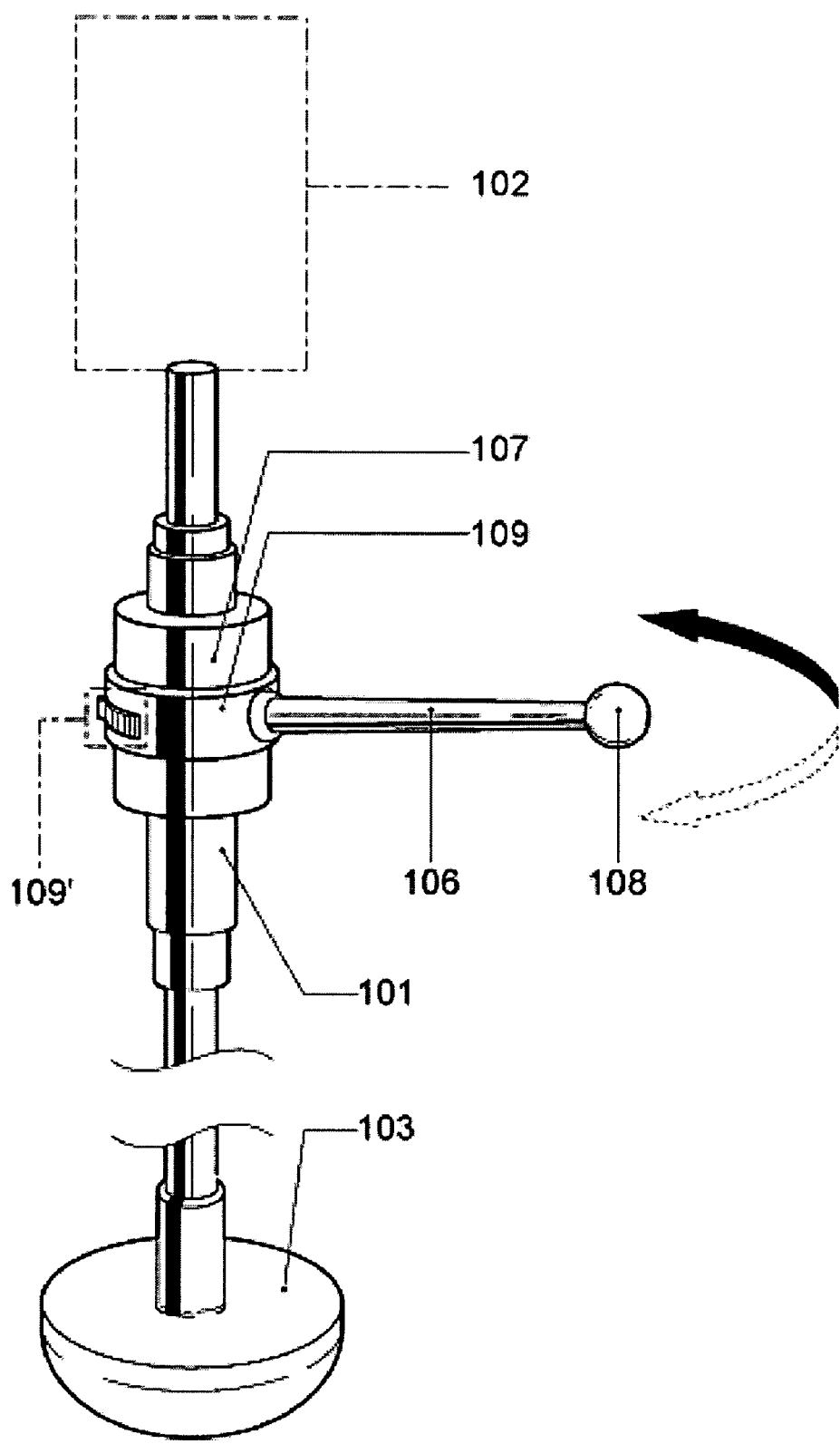
FIG. 26 is a schematic view showing that the preferred embodiment given in FIG. 1 is not provided with a lateral side handle.
Figure 27:
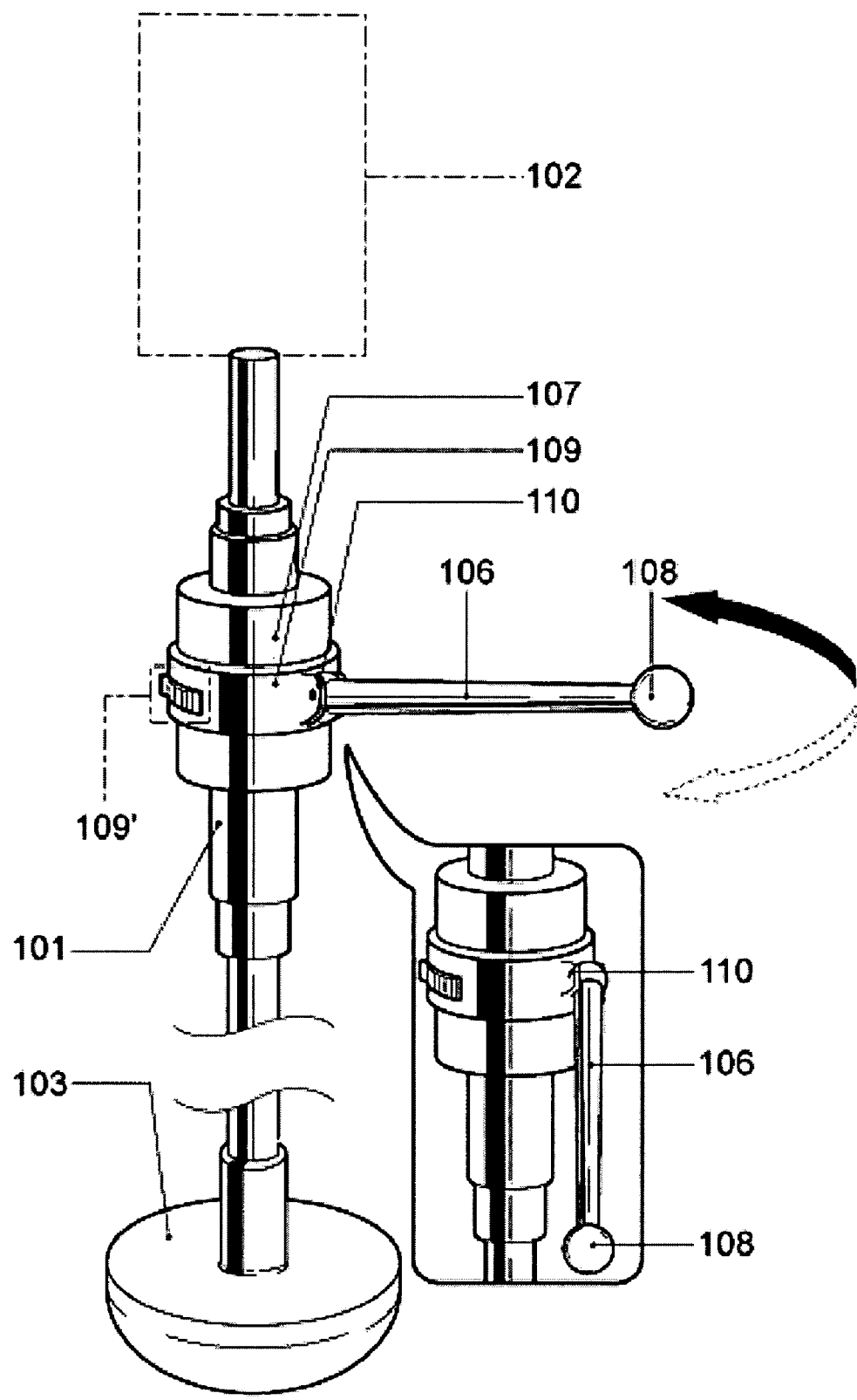
FIG. 27 is a schematic view showing that the preferred embodiment given in FIG. 2 is not provided with a lateral side handle.
Figure 28:
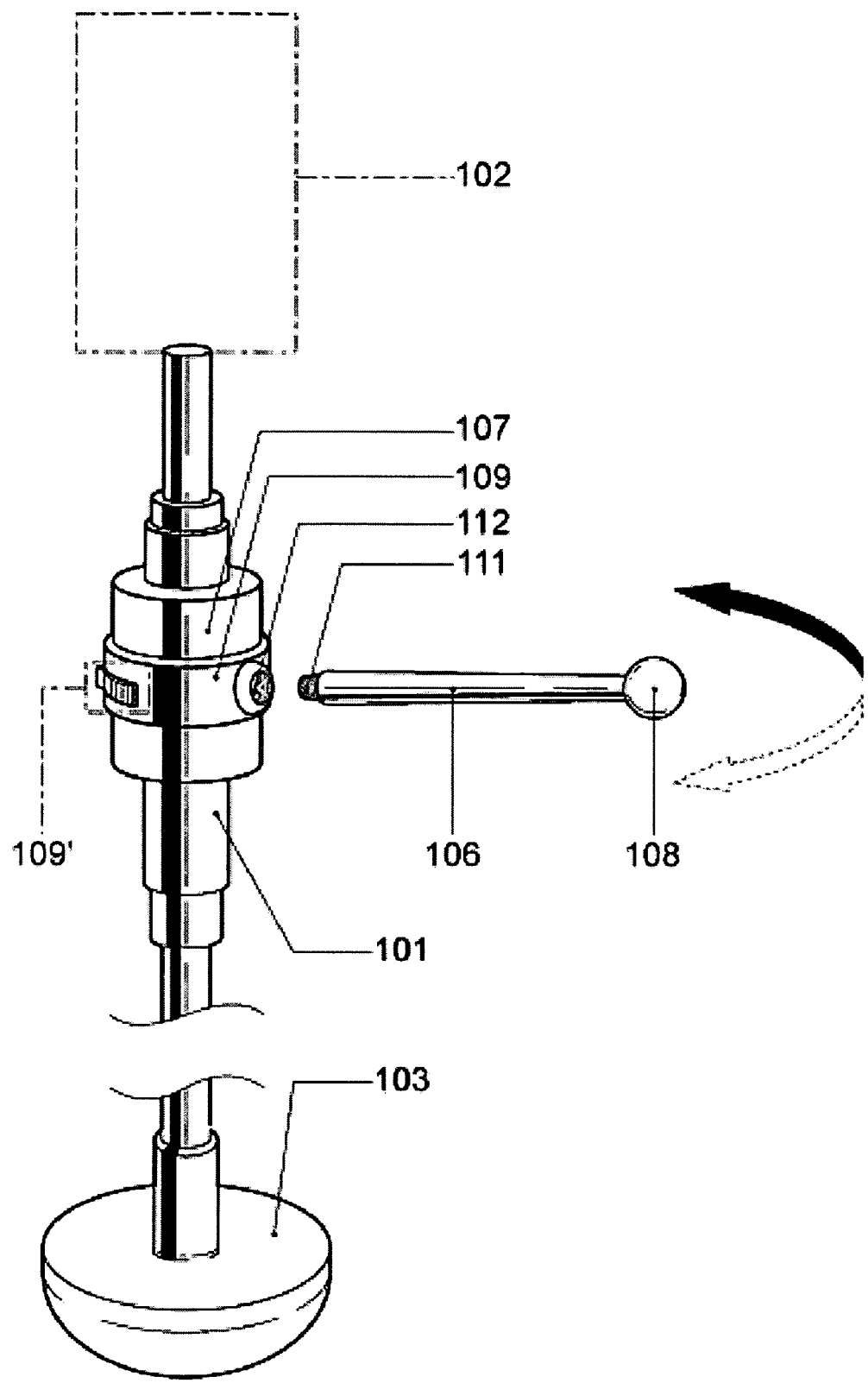
FIG. 28 is a schematic view showing that the preferred embodiment given in FIG. 3 is not provided with a lateral side handle.

However, if the rotation hand tool does not require the lateral side handle 104, the installation of the lateral side handle 104 is waived as illustrated in FIGS. 26, 27 and 28.

(3) To select the one-way drive 109 and the direction controllable drive provided with the switch 109': the one-way drive 109 is selected depending on the working direction if the drive by the tool or the cutter of the rotation hand tool to the work piece is of one-way driving nature so to subject to the drive from the reciprocal wrenching handle 106; and driving in the opposite direction resulting in idling. However, in case of the working nature requires both ways, the direction controllable drive provided with the switch 109' is selected for the reciprocal wrenching handle 106 to drive.

Figure 29:
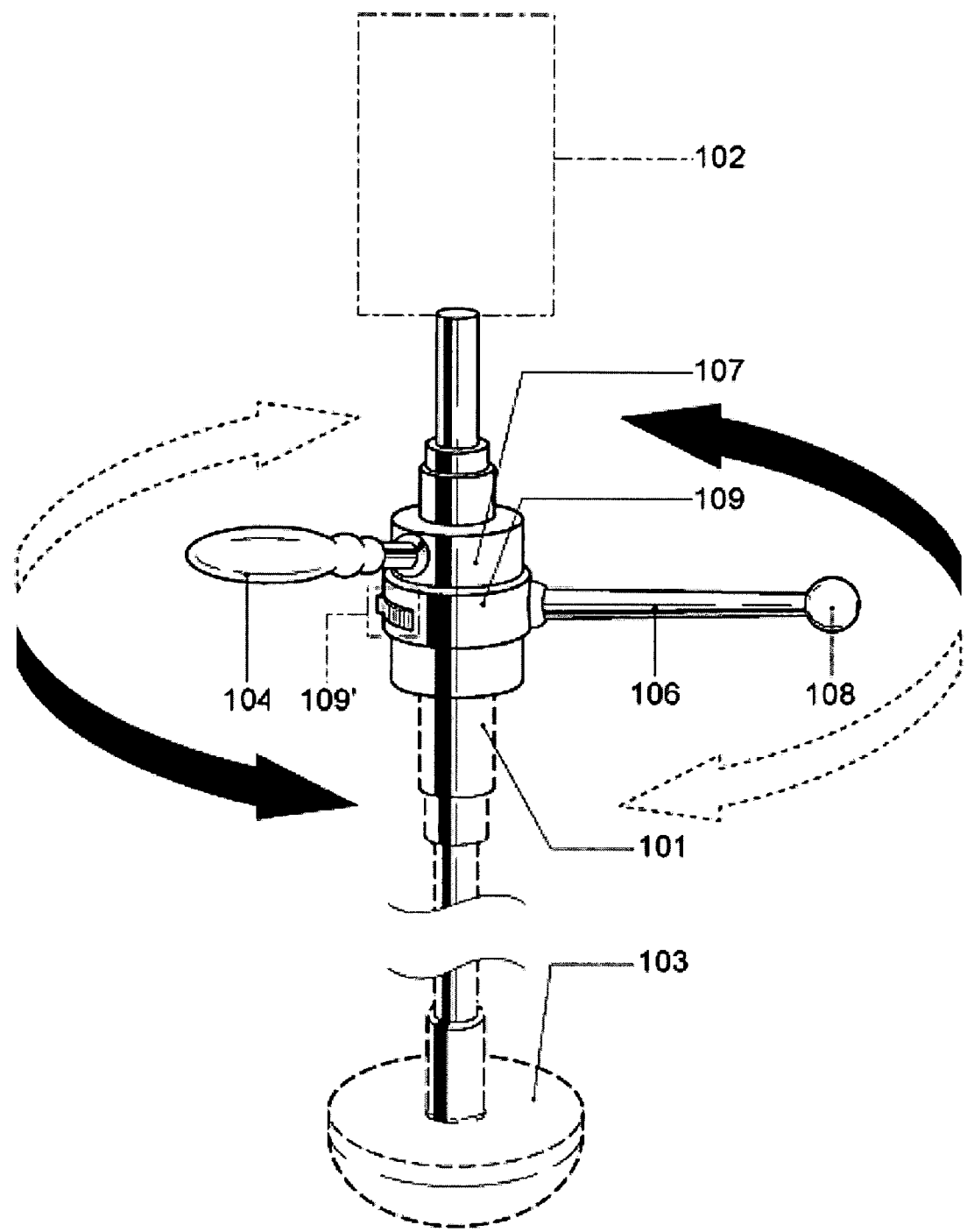
FIG. 29 is a schematic view showing that the lateral side handle 104 and the reciprocal wrenching handle 106 are jointly and directly driving the main shaft.

In addition to relying upon the reciprocal wrenching handle 106 to drive the transmission gear set 107 for executing acceleration, reduction or constant speed output, the following operation methods are available to the wrench drive rotation hand tool with side handle as illustrated in FIG. 29:

(1) In the course the reciprocal wrenching handle 106 is driving the transmission gear set 107 to execute acceleration output, the lateral side handle 104 and the reciprocal wrenching handle 106 are used to directly wrench the main shaft with greater torque in case of a heavier load.

(2) In the course the reciprocal wrenching handle 106 is driving the transmission gear set 107 to execute reduction output, the lateral side handle 104 and the reciprocal wrenching handle 106 are used to directly wrench the main shaft with less torque and faster revolution speed in case of a lighter load.

A wrench drive rotation hand tool with side handle of the present invention provides reliable and specific functions to achieve more stable application of the force by the wrist in the operation. Therefore, this application is duly filed accordingly.

The invention claimed is:

1. A hand tool, comprising:
an elongated column (101) that includes a main shaft;
an output interface (102) connected to an end of the main shaft for driving a cutter or a tool carried thereon;
a handle (106) coupled to the column (101) for driving the hand tool manually;
a transmission gearbox (107) mounted on the column (101), the gearbox having an input end that is coupled to said handle (106) and having an output end that is coupled to the main shaft;
a one-way drive arrangement (109) connected between the handle (106) and the transmission gearbox (107), so that torque is transmitted to the main shaft in a single direction via the transmission gearbox (107) to rotate the main shaft in a single direction when the handle (106) is manually reciprocated, torque being transmitted to the main shaft when the handle (106) is moved in a first direction but not when the handle (106) is moved in a second direction,
wherein the transmission gearbox (107) has a transmission speed ratio, so that a transmitting operation of different speed ratio is formed between the main shaft and the handle (106) when said handle (106) is driven rotatably in the first direction; and
an additional handle (104) connected to the column (101) and extending radially for holding the hand tool steady.

2. The hand tool of claim 1 wherein said transmission gearbox (107) comprises a plurality of gears.

3. The hand tool of claim 2, wherein said transmission gearbox (107) include a sun gear, a planetary gear, and an external ring gear.

4. The hand tool of claim 1 wherein the transmission gearbox (107) is disposed inside the column (101) at a central portion thereof, and further comprising an axial knob (103) connected to the column (101) at an end of the column opposite the output interface for pressing the hand tool axially during operation thereof.

5. The hand tool of claim 2 wherein said one-way drive arrangement (109) includes a switching means (109') for selectively switching a one-way transmitting direction.

6. The hand tool of claim 1 wherein said transmission gearbox (107) includes a switching means for switching an output direction.

* * * * *